United States Patent
Hong et al.

(10) Patent No.: US 10,019,050 B2
(45) Date of Patent: Jul. 10, 2018

(54) METHOD OF POWER MANAGEMENT FOR SAVING ENERGY

(71) Applicant: National Taiwan Normal University, Taipei (TW)

(72) Inventors: Jon-Chao Hong, Taipei (TW); Yi-Hsuan Hung, Taipei (TW); Chi-Ruei Tsai, Taipei (TW); Kai-Wen Tai, Taipei (TW)

(73) Assignee: National Taiwan Normal University, Taipei (TW)

( * ) Notice: Subject to any disclaimer, the term of this patent is extended or adjusted under 35 U.S.C. 154(b) by 173 days.

(21) Appl. No.: 15/292,899

(22) Filed: Oct. 13, 2016

(65) Prior Publication Data

US 2017/0108915 A1    Apr. 20, 2017

(30) Foreign Application Priority Data

Oct. 15, 2015    (TW) ............................. 104133837 A
Aug. 9, 2016     (TW) ............................. 105125241 A

(51) Int. Cl.
*G06F 1/32* (2006.01)

(52) U.S. Cl.
CPC .......... *G06F 1/3287* (2013.01); *G06F 1/3206* (2013.01)

(58) Field of Classification Search
None
See application file for complete search history.

(56) References Cited

U.S. PATENT DOCUMENTS

| 6,553,501 B1 * | 4/2003 | Yokoe .................. G06F 1/3203 713/320 |
| 8,255,715 B2 * | 8/2012 | Kawakami ........... G06F 1/3203 713/320 |
| 8,510,581 B2 * | 8/2013 | Carvalho ................. G06F 1/32 713/2 |
| 9,535,483 B2 * | 1/2017 | Min ...................... G06F 1/3206 |

FOREIGN PATENT DOCUMENTS

CN    202648064 U    1/2013

* cited by examiner

*Primary Examiner* — Stefan Stoynov
(74) *Attorney, Agent, or Firm* — Birch, Stewart, Kolasch & Birch, LLP

(57) ABSTRACT

A method of power management to be implemented by an energy-consuming device includes the steps of: while the energy-consuming device is in an operating state, receiving an input associated with a time period; determining first energy consumption for operation in the operating state for the time period; determining second energy consumption for switching to a shutdown state; determining a smaller one between the first and second energy consumptions; maintaining operation in the operating state when it is determined that the first energy consumption is the smaller one; and switching to the shutdown state when it is determined that the second energy consumption is the smaller one.

5 Claims, 6 Drawing Sheets

METHOD OF POWER MANAGEMENT FOR SAVING ENERGY

CROSS-REFERENCE TO RELATED APPLICATION

This application claims priority of Taiwanese Patent Application Nos. 104133837 and 105125241, filed respectively on Oct. 15, 2015 and Aug. 9, 2016.

FIELD

The disclosure relates to a method of power management, and more particularly to a method of power management for an energy-consuming device and an air conditioner.

BACKGROUND

A computer or an air conditioner is a common energy-consuming device in a house or office. When to be temporarily away from the energy-consuming device, a user may turn off the energy-consuming device for saving energy. However, an energy-consuming device consumes a significant amount of energy to restart. A method of power management for saving energy is thereby required in a scenario that the user is to be temporarily away from the energy-consuming device.

SUMMARY

Therefore, an object of the disclosure is to provide a method of power management that can alleviate at least one of the drawbacks of the prior art.

According to the disclosure, the method of power management is to be implemented by an energy-consuming device. The energy-consuming device is switchable between a shutdown state, where the energy-consuming device consumes substantially no energy, and an operating state, where the energy-consuming device consumes energy under operation. The method includes the steps of:

a) receiving, while the energy-consuming device is in the operating state, an input associated with a time period during which a user is to be temporarily away from the energy-consuming device;

b) determining first energy consumption according to the time period, the first energy consumption being an amount of energy that would be consumed by the energy-consuming device to operate in the operating state for the time period;

c) determining second energy consumption, the second energy consumption being an amount of energy that would be consumed by the energy-consuming device to switch from the shutdown state to the operating state;

d) determining a smaller one between the first energy consumption and the second energy consumption;

e) maintaining operation in the operating state when it is determined that the first energy consumption is the smaller one; and f) switching to the shutdown state when it is determined that the second energy consumption is the smaller one.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
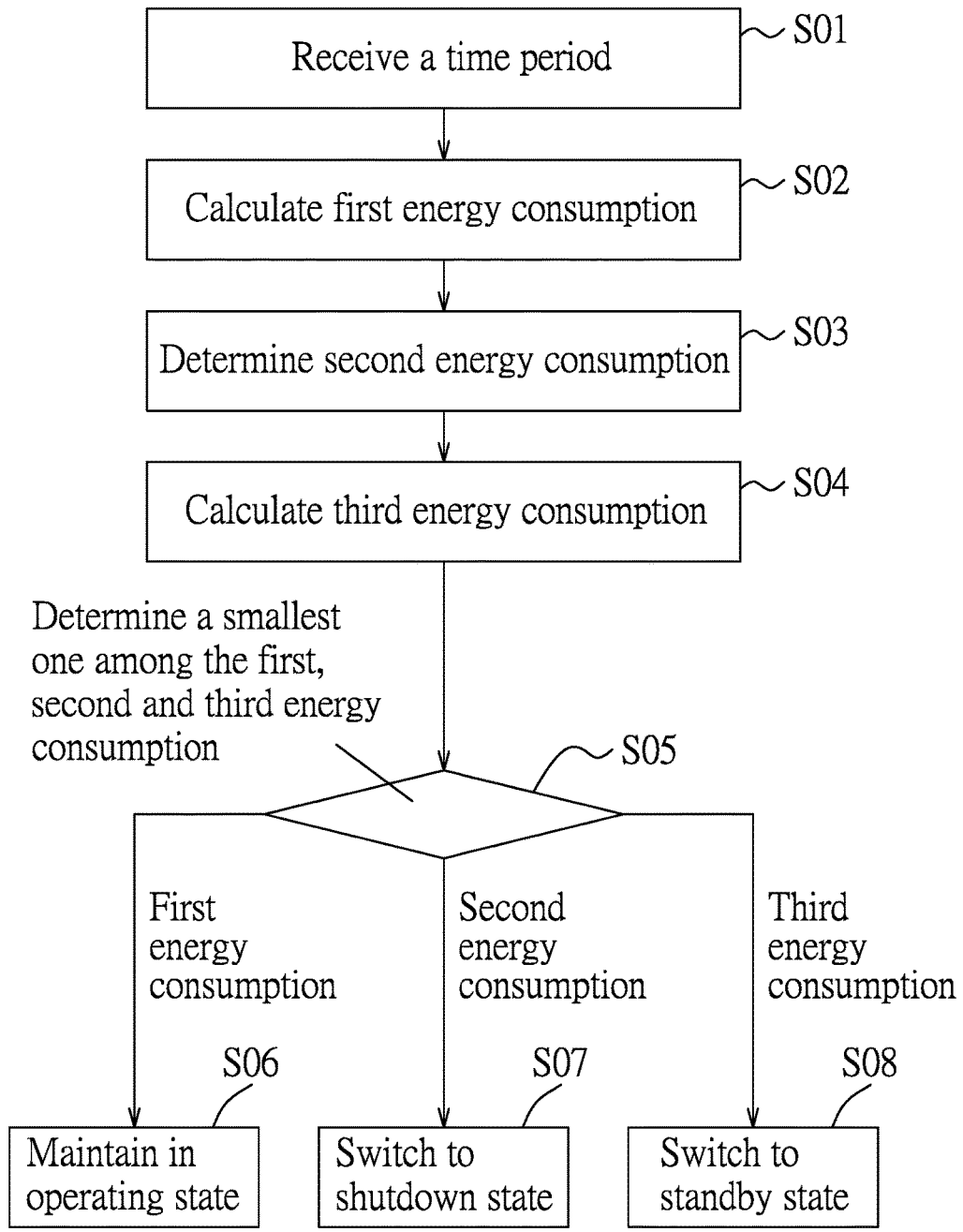
FIG. 1 is a flow chart illustrating a first embodiment of a method of power management for an energy-consuming device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a first embodiment of a method of power management according to the disclosure is illustrated. The method is to be implemented by an energy-consuming device. The energy-consuming device is switchable to one of a shutdown state, where the energy-consuming device consumes substantially no energy, an operating state, where the energy-consuming device consumes energy under operation, and a standby state, where the energy-consuming device consumes less energy compared with that consumed in the operating state. In this embodiment, the energy-consuming device is exemplified as a computer (not shown), but is not limited thereto.

The method of power management has the following steps S01-S07.

In step S01, when in the operating state, the energy-consuming device receives an input associated with a time period during which a user is to be temporarily away from the energy-consuming device. The time period may be, for example, 10 minutes.

Figure 2:
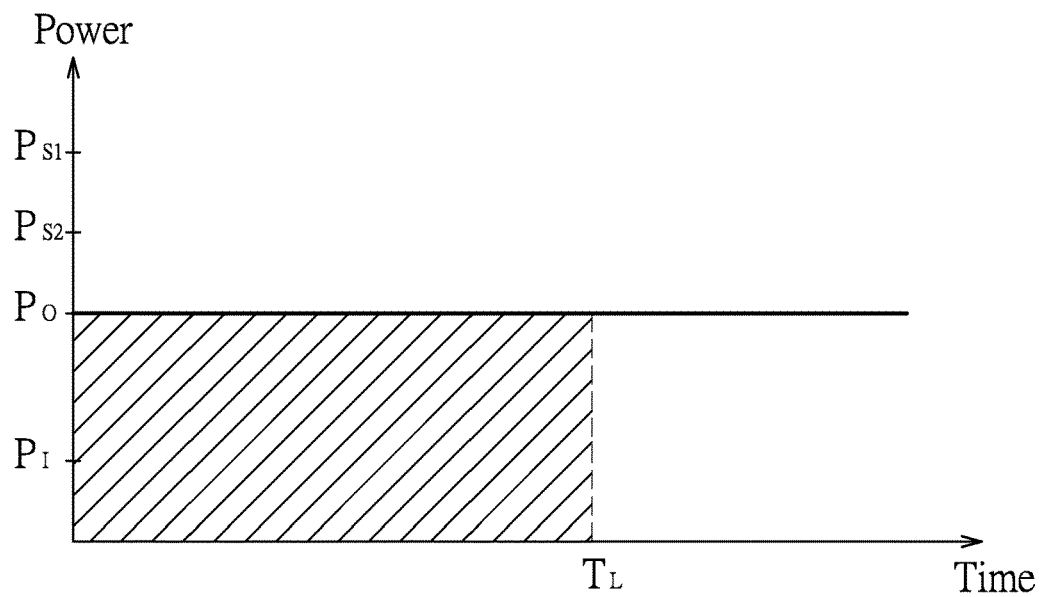
FIGS. 2-4 are schematic diagrams illustrating energy consumption of the energy-consuming device under different operating conditions.

Next, in step S02, the energy-consuming device calculates first energy consumption according to the time period. The first energy consumption is an amount of energy that would be consumed by the energy-consuming device to operate in the operating state for the time period. Referring to FIG. 2, the symbol $P_O$ denotes a value of power of the energy-consuming device when operating in the operating state, and the symbol $T_L$ denotes the time period during which a user is to be temporarily away from the energy-consuming device. Therefore, the first energy consumption is equal to $P_O \times T_L$, i.e., an area of a shaded region in FIG. 2. In this embodiment, the value of the power $P_O$ of the energy-consuming device when operating in the operating state is pre-stored in a database accessible by the energy-consuming device, and is accessed when step S02 is being performed. Note that the database may be part of the energy-consuming device, or may be external to and connectable with the energy-consuming device in a wired or wireless manner.

Figure 3:
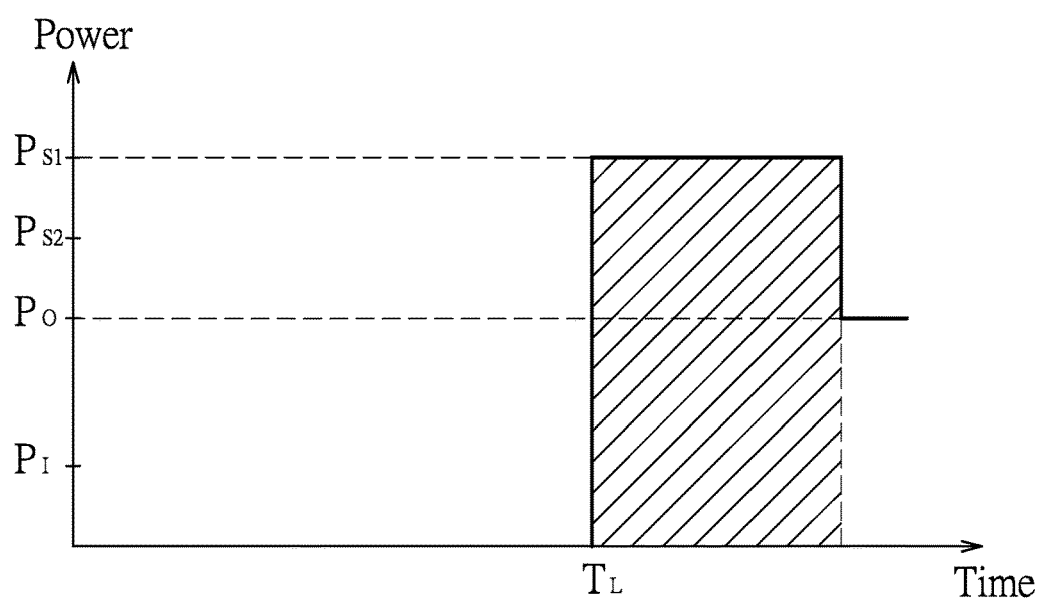

In step S03, the energy-consuming device determines second energy consumption, which is an amount of energy that would be consumed by the energy-consuming device to switch from the shutdown state to the operating state. Referring to FIG. 3, the symbol $P_{S1}$ denotes a value of power of the energy-consuming device to switch from the shutdown state to the operating state. Therefore, the second energy consumption is equal to an area of a shaded region in FIG. 3. In this embodiment, the value of the power $P_{S1}$ of the energy-consuming device to switch from the shutdown state to the operating state is pre-stored in the database accessible by the energy-consuming device, and is accessed when step S03 is being performed.

Figure 4:
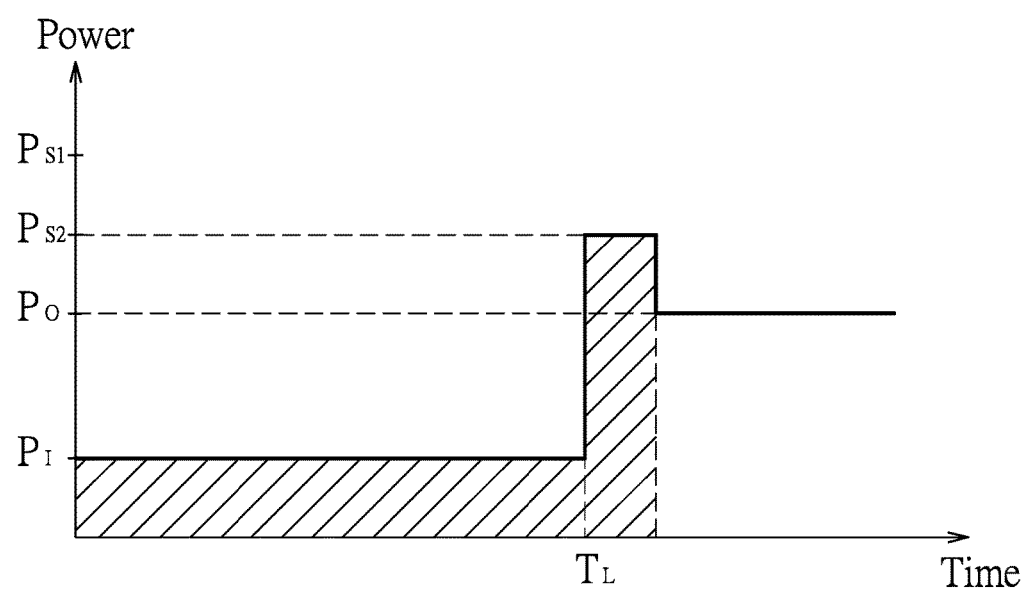

In step S04, the energy-consuming device calculates third energy consumption according to the time period. The third energy consumption is a total amount of energy that would be consumed by the energy-consuming device to operate in the standby state for the time period $T_L$ and to then switch from the standby state to the operating state. Referring to FIG. 4, the symbol $P_1$ denotes a value of power of the energy-consuming device when operating in the standby state, and the symbol $P_{S2}$ denotes a value of power of the energy-consuming device to switch from the standby state to the operating state. Therefore, the third energy consumption is equal to an area of a shaded region in FIG. 4. In this embodiment, the value of the power $P_1$ of the energy-consuming device when operating in the standby state, and the value of the amount of energy $Q_{S2}$ consumed by the energy-consuming device to switch from the standby state to the operating state are pre-stored in the database, and are accessed when step S04 is being performed. Therefore, the third energy consumption is equal to $P_1 \times T_L + Q_{S2}$. Note that steps S02 to S04 may be performed in alternative order than that depicted in FIG. 1, or may be performed simultaneously in other embodiments of this disclosure.

Subsequently, in step S05, the energy-consuming device determines a smallest one among the first energy consumption, the second energy consumption and the third energy consumption.

When it is determined that the first energy consumption is the smallest one, as shown in step S06, the energy-consuming device maintains operation in the operating state. When it is determined that the second energy consumption is the smallest one, as shown in step S07, the energy-consuming device switches to the shutdown state. When it is determined that the third energy consumption is the smallest one, as shown in step S08, the energy-consuming device switches to the standby state. As a result, the energy-consuming device automatically chooses to operate in one of the operating state, the shutdown state and the standby state to consume the least amount of energy (i.e., to be the most energy-saving) while the user is temporarily away from the energy-consuming device for the time period $T_L$. The energy-consuming device is switched from the shutdown state or the standby state back to the operating state when the user returns to the energy-consuming device. This state-switching can be automatically performed by the energy-consuming device once the time period has elapsed, or may be triggered by an input from the user.

Figure 5:
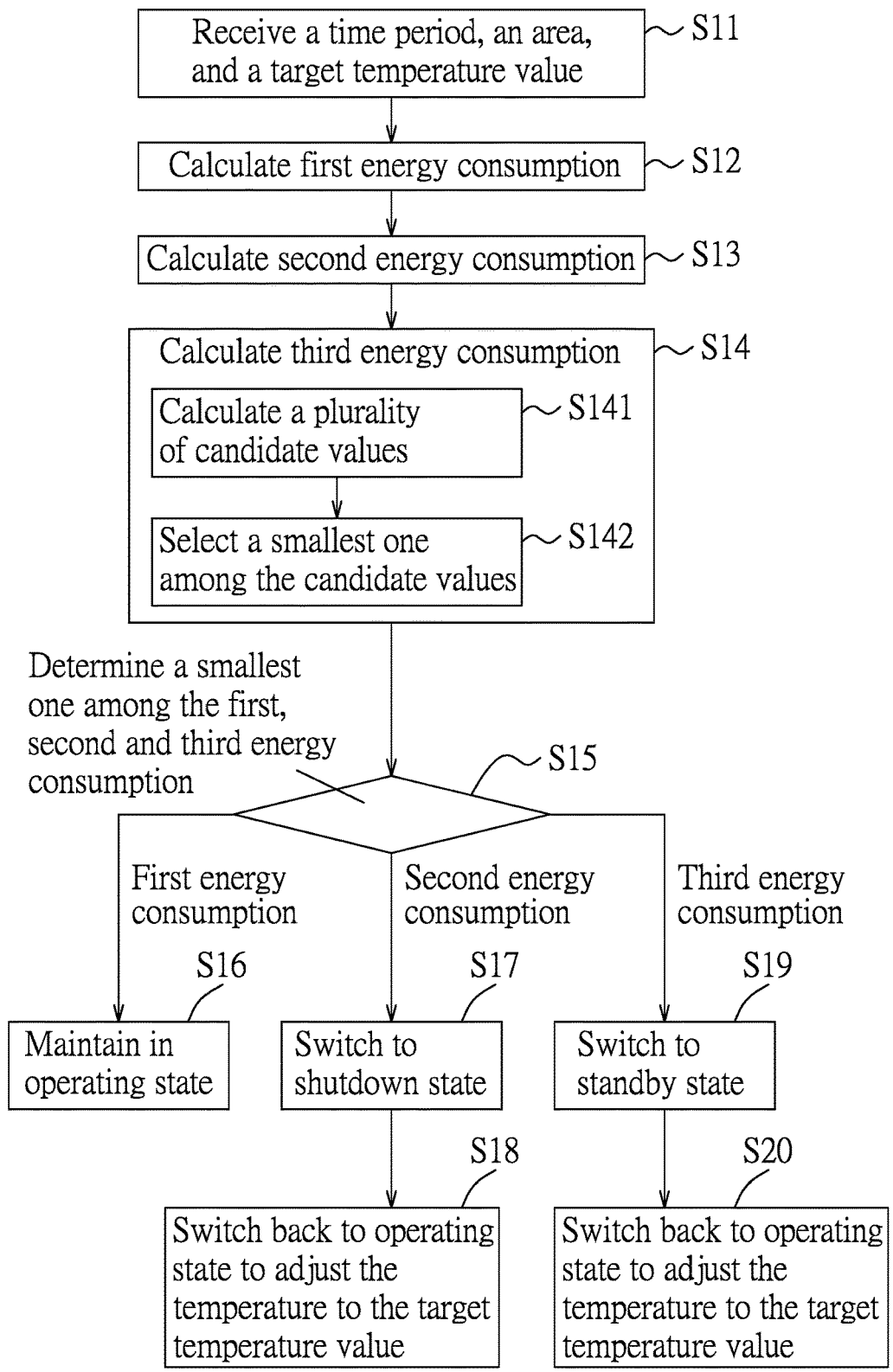
FIG. 5 is a flow chart illustrating a second embodiment of the method of power management for an air conditioner according to the disclosure.

Referring to FIG. 5, a second embodiment of the method of power management according to the disclosure is illustrated. The energy-consuming device is an air conditioner (not shown) which measures a temperature outdoors to obtain an outdoor temperature value. The air conditioner is, but is not limited to, a cooler in this embodiment, and may be a heater in other embodiments. The air conditioner is switchable to one of a shutdown state, where the air conditioner consumes substantially no energy, an operating state, where the air conditioner consumes energy under operation, and a standby state, where the air conditioner consumes less energy compared with that consumed in the operating state.

The method has the following steps S11-S20.

In step S11, while in the operating state, the air conditioner receives the input associated with a time period, e.g., 30 minutes, during which the user is to be temporarily away from a space where the air conditioner is located, an input associated with an area, e.g., 100 square meters, of the space, and an input associated with a target temperature value, e.g., 25° C.

Figure 6:
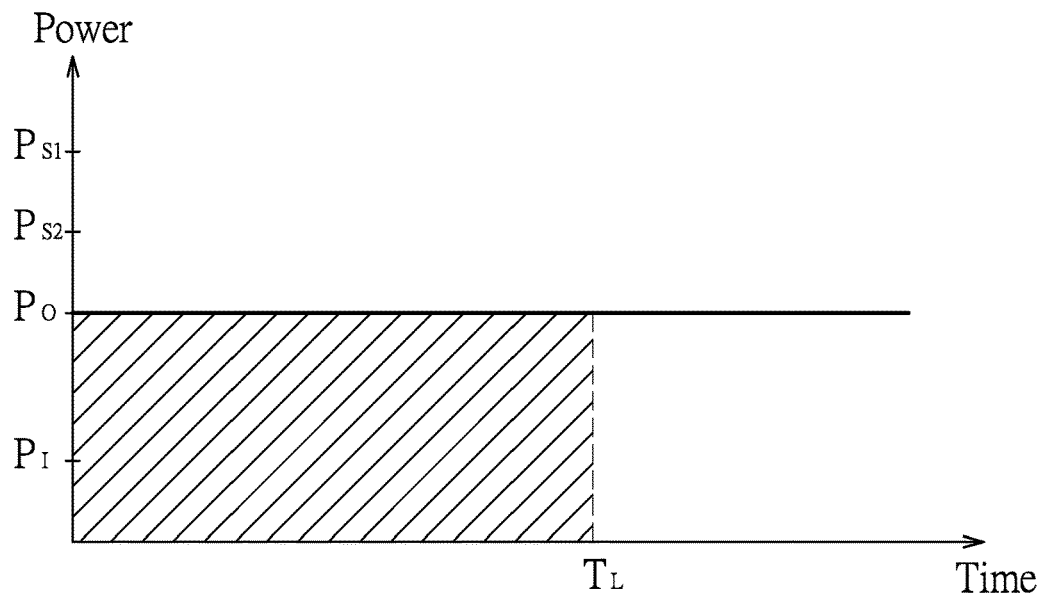
FIGS. 6-8 are schematic diagrams illustrating energy consumption of the air conditioner under different operating conditions.

Next, in step S12, the air conditioner calculates first energy consumption according to the time period, the area, the target temperature value and the outdoor temperature value. The first energy consumption is an amount of energy that would be consumed by the air conditioner to operate in the operating state for the time period to maintain a temperature in the space at the target temperature value. Referring to FIG. 6, the symbol $P_O$ denotes a value of power of the air conditioner when operating in the operating state to maintain the temperature in the space at the target temperature value, and the symbol $T_L$ denotes the time period during which the user is to be temporarily away from the air conditioner. Therefore, the first energy consumption is equal to $P_O \times T_L$, i.e., an area of a shaded region in FIG. 6.

In this embodiment, the air conditioner includes a database. The database pre-stores a plurality of values of the power $P_O$ of the air conditioner when operating in the operating state to maintain the temperature in the space at the target temperature value, and each of the plurality of values of the power $P_O$ corresponds to a distinct combination of different areas of the space, different target temperature values and different outdoor temperature values. When step S12 is being performed, according to the area and the target temperature value inputted by the user, and the outdoor temperature value obtained by the air conditioner, a corresponding one of the values of the power $P_O$ is accessed for calculation of the first energy consumption.

Figure 7:
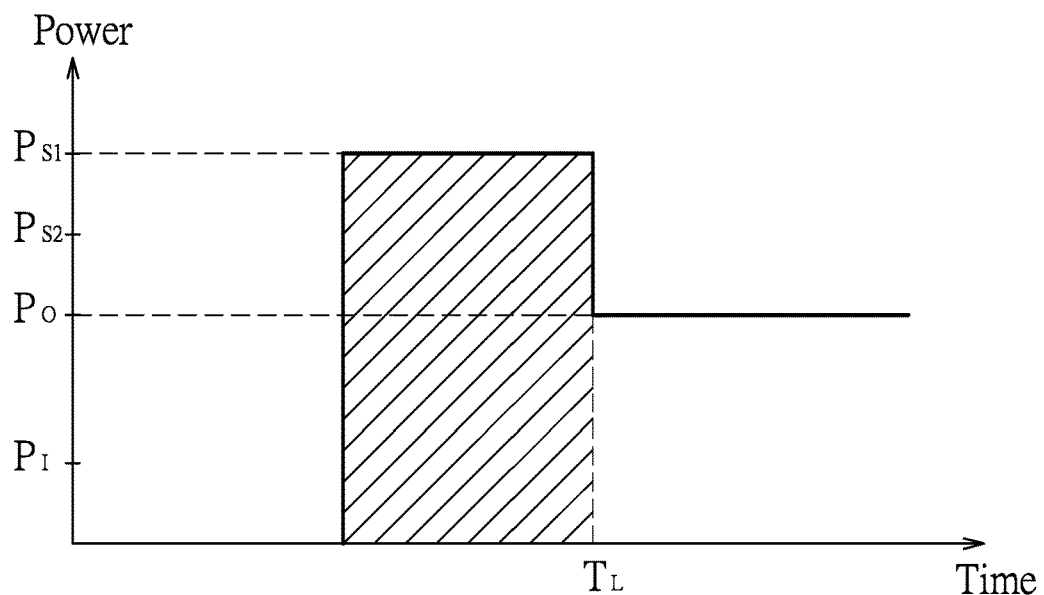

Thereafter, in step S13, the air conditioner calculates second energy consumption according to the area, the target temperature value and the outdoor temperature value. The second energy consumption is a total amount of energy consumed by the air conditioner to switch from the shutdown state to the operating state and to then adjust the temperature in the space to the target temperature value when operating in the operating state. Referring to FIG. 7, the symbol $P_{S1}$ denotes a value of power of the air conditioner to switch from the shutdown state to the operating state and to operate in the operating state to adjust the temperature in the space to the target temperature value. Therefore, the second energy consumption is equal to an area of a shaded region in FIG. 7.

In this embodiment, the database accessible by the air conditioner pre-stores a value of the amount of energy $Q_{S1}$ consumed by the air conditioner to switch from the shutdown state to the operating state. In addition, the database pre-stores a plurality of values of the amount of energy $Q_{EO}$ consumed by the air conditioner to operate in the operating state to maintain the temperature in the space at the target temperature value, and each of the plurality of values of the amount of energy $Q_{EO}$ corresponds to a respective combination of different areas, different target temperature values and different outdoor temperature values. When step S13 is being performed, according to the area and the target temperature value inputted by the user, and the outdoor temperature value obtained by the air conditioner, a corresponding one of the values of the amount of energy $Q_{EO}$ is accessed for calculation of the second energy consumption, where the second energy consumption is equal to $Q_{S1}+Q_{EO}$.

Figure 8:
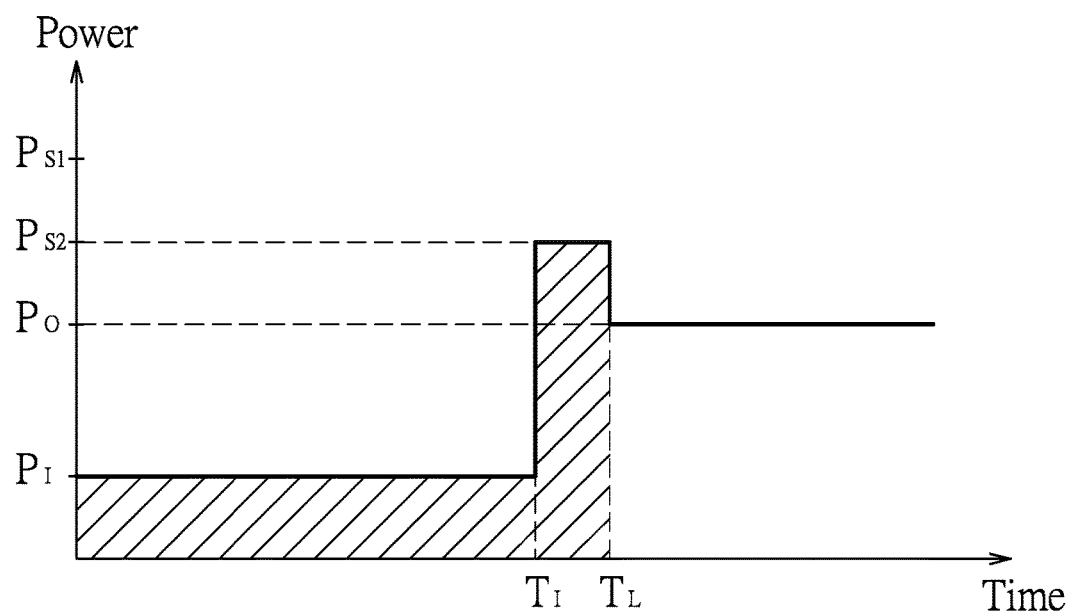

Subsequently, in step S14, the air conditioner calculates third energy consumption according to the time period, the area, the target temperature value and the outdoor temperature value. The third energy consumption is a total amount of energy that would be consumed by the air conditioner to operate in the standby state for a standby time, e.g. 20 minutes, which is shorter than the time period, to maintain the temperature in the space at a standby temperature value, e.g., 30° C., and to then switch to operate in the operating state to adjust the temperature in the space from the standby temperature value to the target temperature value. Referring to FIG. 8, the symbol $P_1$ denotes a value of power of the air conditioner when operating in the standby state, the symbol $P_{S2}$ denotes a value of power of the air conditioner when operating in the operating state to adjust the temperature in the space from the standby temperature value to the target temperature value, and the symbol $T_1$ denotes the standby time. Therefore, the third energy consumption is equal to an area of a shaded region in FIG. 8.

In this embodiment, the database pre-stores the value of power $P_1$ of the air conditioner when operating in the standby state. In addition, the database pre-stores a plurality of values of regulating duration $T_{IO}$ and a plurality of values of amount of energy $Q_{IO}$ consumed by the air conditioner to operate in the operating state for the regulating duration $T_{IO}$ to adjust the temperature in the space from the standby temperature value to the target temperature value. Each of the plurality of values of regulating duration $T_{IO}$ corresponds to a distinct combination of different areas, different target temperature values and different outdoor temperature values. Each of the plurality of values of amount of energy $Q_{IO}$ corresponds to a distinct combination of different areas, different target temperature values and different outdoor temperature values. When step S14 is being performed, according the area and the target temperature value inputted by the user, and the outdoor temperature value obtained by the air conditioner, a corresponding one of the values of the regulating duration $T_{IO}$ and a corresponding one of the values of the amount of energy $Q_{IO}$ are accessed for calculation of the standby time, where $T_f = T_L - T_{IO}$, and the third energy consumption, where the third energy consumption equals $P_1 \times T_f + Q_{IO}$.

Moreover, in this embodiment, step S14 includes the following sub-steps S141 and S142. In step S141, the air conditioner calculates a plurality of candidate values respectively corresponding to a plurality of standby temperature values (e.g., 28° C., 29° C., 30° C., 31° C. and 32° C.) associated with the standby state according to the time period, the area, the target temperature value and the outdoor temperature value. Each of the candidate values is the total amount of energy that would be consumed by the air conditioner to operate in the standby state for the standby time to maintain the temperature in the space at the respective one of the standby temperature values, and to then switch to operate in the operating state to adjust the temperature in the space from the respective one of the standby temperature values to the target temperature value. In step S142, the air conditioner selects a smallest one among the plurality of candidate values to serve as the third energy consumption.

Note that in other embodiments, steps S12 to S14 may be performed in alternative order than that depicted in FIG. 5, or may be performed simultaneously in other embodiments of this disclosure.

Next, in step S15, the air conditioner determines the smallest one among the first energy consumption, the second energy consumption and the third energy consumption.

When it is determined that the first energy consumption is the smallest one, the air conditioner maintains operation in the operating state as shown in step S16.

When it is determined that the second energy consumption is the smallest one, the air conditioner switches to the shutdown state as shown in step S17, and switches from the shutdown state back to the operating state before the time period elapses to adjust the temperature in the space to the target temperature value as shown in step S18. In this embodiment, the database further pre-stores a value of a first time span it takes for the air conditioner to switch from the shutdown state to the operating state, and a plurality of values of a second time span it takes for the air conditioner to operate in the operating state to adjust the temperature in the space to the target temperature value. Each of the plurality of values of the second time spend corresponds to a distinct combination of the different areas, the different target temperature values and the different outdoor temperature values. Therefore, the air conditioner is capable of calculating a time instant at which the air conditioner is to switch to the operating state from the shutdown state in step S18.

When it is determined that the third energy consumption is the smallest one, as shown in step S19, the air conditioner switches from the operating state to operate in the standby state for the standby time to maintain the temperature in the space at the standby temperature value. As shown in step S20, the air conditioner switches back to the operating mode to adjust the temperature in the space from the standby temperature value to the target temperature value after the standby time has elapsed. Consequently, the air conditioner can automatically select one of the operating state, the shutdown state and the standby state to save the greatest amount of energy while the user is temporarily away from the space where the air conditioner is located for the time period.

To sum up, the method of this disclosure includes steps of determining the smallest one among the first energy consumption, the second energy consumption and the third energy consumption, and choosing accordingly to operate in one, or an ordered combination, of the shutdown state, the operating state and the standby state for effectively saving energy. The purpose of this disclosure is consequently achieved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:
1. A method of power management to be implemented by an energy-consuming device, the energy-consuming device being switchable between a shutdown state, where the energy-consuming device consumes substantially no energy, and an operating state, where the energy-consuming device consumes energy under operation, said method comprising steps of:
- a) receiving, while the energy-consuming device is in the operating state, an input associated with a time period;
- b) determining first energy consumption according to the time period, the first energy consumption being an amount of energy that would be consumed by the energy-consuming device to operate in the operating state for the time period;
- c) determining second energy consumption, the second energy consumption being an amount of energy that would be consumed by the energy-consuming device to switch from the shutdown state to the operating state;
- d) determining a smaller one between the first energy consumption and the second energy consumption;
- e) maintaining operation in the operating state when it is determined that the first energy consumption is the smaller one; and
- f) switching to the shutdown state when it is determined that the second energy consumption is the smaller one.

2. The method as claimed in claim 1, the energy-consuming device further switchable to a standby state, where the energy-consuming device consumes less energy compared with that consumed in the operating state, the method further comprising, prior to step d), a step of:
- g) determining third energy consumption according to the time period, the third energy consumption being a total amount of energy that would be consumed by the energy-consuming device to operate in the standby state for the time period and to then switch from the standby state to the operating state;
- wherein step d) includes determining a smallest one among the first energy consumption, the second energy consumption and the third energy consumption;
- wherein step e) includes maintaining operation in the operating state when it is determined that the first energy consumption is the smallest one;
- wherein step f) includes switching to the shutdown state when it is determined that the second energy consumption is the smallest one; and
- the method further comprising, subsequent to step d), the step of:
- h) switching to the standby state when it is determined that the third energy consumption is the smallest one.

3. The method as claimed in claim 1, the energy-consuming device being an air conditioner which measures a temperature outdoors to obtain an outdoor temperature value, wherein:
- step a) includes receiving, when the energy-consuming device is in the operating state, the input associated with the time period, an input associated with an area of a space where the air conditioner is located, and an input associated with a target temperature value;
- step b) includes determining the first energy consumption according to the time period, the area, the target temperature value and the outdoor temperature value, the first energy consumption being an amount of energy that would be consumed by the air conditioner to operate in the operating state for the time period to maintain a temperature in the space at the target temperature value;
- step c) includes determining the second energy consumption according to the area, the target temperature value and the outdoor temperature value, the second energy consumption being a total amount of energy that would be consumed by the air conditioner to switch from the shutdown state to the operating state and to then operate in the operating state to adjust the temperature in the space to the target temperature value; and
- step f) includes when it is determined that the second energy consumption is the smaller one, switching to the shutdown state, and then switching from the shutdown state back to the operating state before the time period elapses to adjust the temperature in the space to the target temperature value.

4. The method as claimed in claim 3, the air conditioner further switchable to a standby state, where the air conditioner consumes less energy compared with that consumed in the operating state, the method further comprising, prior to step d), a step of:
- i) determining third energy consumption according to the time period, the area, the target temperature value and the outdoor temperature value, the third energy consumption being a total amount of energy that would be consumed by the air conditioner to operate in the standby state for a standby time, which is shorter than the time period, to maintain the temperature in the space at a standby temperature value, and to then switch to operate in the operating state to adjust the temperature in the space from the standby temperature value to the target temperature value;
- wherein step d) includes determining the smallest one among the first energy consumption, the second energy consumption and the third energy consumption;
- wherein step e) includes maintaining operation in the operating state when it is determined that the first energy consumption is the smallest one; and
- step f) includes when it is determined that the second energy consumption is the smallest one, switching to the shutdown state, and then switching from the shutdown state back to the operating state before the time period elapses to adjust the temperature in the space to the target temperature value;
- the method further comprising, subsequent to step d), steps of:
- j) switching from the operating state to operate in the standby state for the standby time to maintain the temperature in the space at the standby temperature value when it is determined that the third energy consumption is the smallest one; and
- k) switching back to the operating mode to adjust the temperature in the space from the standby temperature value to the target temperature value after the standby time has elapsed.

5. The method as claimed in claim 4, wherein step i) includes sub-steps of:
- i1) determining a plurality of candidate values respectively corresponding to a plurality of standby temperature values associated with the standby state according to the time period, the area, the target temperature value and the outdoor temperature value, each of the candidate values being the total amount of energy that would be consumed by the air conditioner to operate in the standby state for the standby time to maintain the temperature in the space at a respective one of the standby temperature values, and to then switch to operate in the operating state to adjust the temperature in the space from the respective one of the standby temperature values to the target temperature value; and
- i2) selecting a smallest one among the plurality of candidate values to serve as the third energy consumption.

* * * * *